United States Patent [19]

Spurgeon

[11] Patent Number: 5,197,223

[45] Date of Patent: Mar. 30, 1993

[54] DOWNRIGGER LINE TENDER CONTROL

[76] Inventor: Cecil R. Spurgeon, 5610 Tehama Ave., Richmond, Calif. 94804

[21] Appl. No.: 730,068

[22] Filed: Jul. 15, 1991

[51] Int. Cl.5 .............................................. A01K 91/00
[52] U.S. Cl. .................................................. 43/43.12
[58] Field of Search ........................................ 43/43.12

[56] References Cited

U.S. PATENT DOCUMENTS

| | | | |
|---|---|---|---|
| 3,778,918 | 12/1973 | Emory Sr. | 43/43.12 |
| 4,028,837 | 6/1977 | Clark | 43/43.12 |
| 4,065,869 | 6/1978 | Berry | 43/43.12 |
| 4,221,068 | 3/1980 | Roemer Jr. | 43/43.12 |
| 4,255,890 | 4/1981 | Smith | 43/43.12 |
| 4,261,130 | 10/1981 | Cudnohufsky | 43/43.12 |
| 4,395,841 | 1/1983 | Cudnohufsky | 43/43.12 |
| 4,417,414 | 7/1983 | Hood | 43/43.12 |
| 4,430,823 | 2/1984 | Henze | 43/43.12 |
| 4,494,334 | 9/1985 | Porter | 43/43.12 |
| 4,656,776 | 4/1987 | Macachor | 43/43.12 |
| 4,809,457 | 11/1989 | Macachor | 43/43.12 |
| 4,825,583 | 5/1989 | Kammeraad | 43/43.12 |
| 4,872,281 | 3/1989 | Burgess | 43/43.12 |
| 4,945,670 | 2/1990 | Wetherald | 43/43.12 |

Primary Examiner—Kurt C. Rowan

[57] ABSTRACT

A line tender control mechanism used in conjunction with a downrigger fishing assembly whereby a fishing line can be easily secured and released when a fish strikes a bait at the end of the line. The line tender control can be attached to a downrigger cable or the fin of a downrigger weight. The mechanism is made of a single-unit construction having two screw holes near the connector end of the base which allows the device to be mounted to the fin of a downrigger weight, and three pins extending from the same end of the base permitting the unit to be quickly attached—at any location—on a downrigger cable. Opposite the connector end of the device is a compression pad that locks and firmly holds a fishing line between the two pad surfaces until the trip lever is moved to its unlocked position. In the center of the line tender control device is a single-piece trip lever mechanism which secures the compression pad in a locked position when the upper section of the trip lever is moved in the direction of the compression pad and against the trip lever stop. At the lower end of the trip lever is a notch that secures the fishing line to the trip lever. When the lower part of the trip lever is pulled in the rearward direction by a minimum horizontal force, regardless of the magnitude of the vertical force exerted on the fishing line, the upper section of the trip lever traverses in the opposite direction simultaneously releasing the fishing line secured by the compression pad and the fishing line notch at the end of the trip lever. Therein, the fishing line if freed of any unnecessary weight allowing the fish to be played in a sportsman-like manner.

3 Claims, 3 Drawing Sheets

DOWNRIGGER LINE TENDER CONTROL

BACKGROUND—FIELD OF INVENTION

This invention relates to fishing line tending control devices, such as, line holding and releasing mechanism used in conjunction with downrigger fishing systems.

BACKGROUND—DESCRIPTION OF PRIOR ART

The present invention relates to devices commonly referred to as fishing line releases which are used in conjunction with downrigger fishing equipment. A downrigger system is used for trolling a fishing bait from a moving boat to most any desired depth. These devices permit one or more fishing lines to be held by and released from a weighted cable at depths unattainable otherwise. When a nearhorizontal force, as when a fish strikes, is applied to the bait end of the fishing line, the release mechanism frees the fishing line allowing the fish to be played without the presence of a heavy weight. Although downrigger equipment varies in design, generally it consist of: a heavily constructed reel, a boom and a pulley that is attached to some part of the upper structure of a boat. This reel contains several hundred feet of stainless steel cable that is used to lower a heavy weight, to which a fishing line is attached, to most any selected fishing depth. To hold and disconnect a fishing line from a downrigger system, a line release mechanism is required. The release device is attached in some manner to either the downrigger cable, or to the downrigger weight itself. Also, certain fishing conditions dictate that releases device be attached to the cable and the weight at the same time. The release device is triggered when a sufficient force, such as a fish strike, in the rearward direction presents itself. The line is instantly freed from the downrigger system allowing a fish to be played without the presence of any unnecessary strain on the fishing line.

Before the optimal release of a fishing line can be achieved, the effects of both vertical and horizontal forces must be understood. Vertical forces are those forces applied to the fishing line leading from the line containment device, normally a fishing rod and reel, to the release mechanism. These forces are influenced by the drag applied to the line as it moves through the water or by tightening the line at the line containment core, fishing reel. Horizontal forces are those forces applied to the fishing line between the release mechanism and the bait. Horizontal forces are influenced by the boat and current speed, and the drag created on the bait as it is pulled through the water, and the force created by the pull of a fish strike, or if the bait catches on an underwater obstacle.

The model release of a fishing line is only achieved when the release mechanism is activated by a horizontal force applied to the bait at the end of the line. Therefore, it becomes evident that the isolation of these two forces is imperative.

Release devices currently available in the market place have several disadvantages:

a) A Premature line release occurs at some point as the fishing line is being lowered to the desired depth. Premature releases of this type are even more common when fishing rough waters. Line releases of this nature intensified because vertical and horizontal forces applied to the release device are treated as one force. This disadvantage is represented in the design of most prior art.

b) Line crimping occurs when a fishing line is wedged between two hard surfaces. The crimped line is thereby weakened, and ultimately results in line breakage.

c) Frequently, the release device will not disconnect the fishing line when a small fish has been caught; therefore the fish is drug for long periods of time before the condition is realized and corrected.

d) Line release devices having two or more parts that must be assembled before or during use, decreases the ease by which the device can be used.

e) The means by which the a release device must be attached to a downrigger cable is often cumbersome.

f) The attachment of a line release is limited to only one location on the downrigger, or control cable, or requires considerable effort to relocate, or cannot be solidly mounted directly to the fin of an existing downrigger weight.

One release device that exhibits several of the disadvantages noted, is disclosed within the U.S. Pat. No. 4,809,457 (1989) issued to Macachor. Macachor's release is limited to one location on a downrigger cable. Also, his release requires that at least five figure-8 turns of the fishing line be placed around one part of the locking mechanism in order to secure the line. When fishing rough waters, having to make just one turn is difficult, let alone several special turns. Macachor's device treats the vertical and horizontal forces as one. Inthat vertical forces and horizontal forces vary independently of one another and are influenced by many things, such as: a) depth of weight, b) boat speed, c) current speed, d) fishing rod loading, e) length of trolling line from release to bait, and f) bait size, they must be addressed on their own merits and effects if a proper release of the fishing line is to be achieved. Macachor's design also consists of several parts making it more expensive to produce than the present invention.

Another such device was issued to Clark under U.S. Pat. No. 4,028,837 (1977). It too is limited to a fixed position on a downrigger cable and cannot be used with existing downrigger weights, inthat his release and the weight constitute a single embodiment. Additionally, Clark's design requires several specail wraps and turns of a fishing line to load the system for operation. His release requires that a small cylindrical plunger be connected to a fishing line via a small slot located at one end of the plunger. The plunger is then placed into a cylinder containing a spring that must be compressed before a locking lever can be engaged. Inthat the plunger is independent of the main body, a series of disadvantages occur. Each time the fishing line is freed from the release mechanism, the plunger travels to the bait end of the fishing line. In order to retrieve the plunger, the fishing line must be fully reeled in. The plunger must then be disconnected and reconnected to the fishing line after the desired length of trolling line has been released. Additionally, there is a high risk of dropping the plunger into the water and loosing it. If replacement plungers are unavailable, the release becomes inoperable. Should the plunger be dropped or fumbled before it is secured in the cylinder, the line will unwrap; therefore, the plunger must be again wrapped with the required number of turns of the fishing line before making another attempt to load and lock the device. When the use of a large fishing line is required, making and holding several turns of a line around a small object is very difficult. This added requirement increases the degree of user difficulty, especially when fishing rough seas, or in cold weather. Clark's design, requires the user to manipulate several small parts, some unattached, to render his release operational. Another disadvantage of his design is small, unattached items which are easily dropped and often cannot be retrieved. The small parts contained in Clark's device i.e., pin, trigger, wire hooks and shafts are subject to damage if dropped under normal fishing conditions. Inthat the present invention has no loose elements and is of a single embodiment, it becomes the mechanism of preference.

Roemer, Jr's. Fishing Line Holder U.S. Pat. No. 4,221,068 (1980) requires some disassembly in order to attach the device to a downrigger cable. Such requirements increase the danger of dropping small parts in the water, therefore rendering the device inoperable. Roemer, Jr's design also does not differentiate between vertical and horizontal forces placed on the release. Therefore, as earlier stated, whenever there is a change in either the vertical or horizontal forces, tension adjustments to the trip or trigger mechanism must be made. In the event such adjustments are not made, a proper release of the fishing line cannot be achieved. Also his design has a number of moving parts i.e., pivot levers, adjustment screws, springs and linkages that increase unit complexity and product production costs.

The Wetherald patent,. U.S. Pat. No. 4,945,670 (1990) has several major flaws including: a) line crimping, b) requirement of a screwdriver to make release trigger tension adjustments, c) inability to be mounted directly to a downrigger weight, d) treatment of vertical and horizontal forces as a single force, and e) uncertainty as to the range of fishing line sizes—test pounds—his design will accommodate. Inthat the fishing line is cinched between the two parallel legs of the main body and the sides of the trigger as it is pivoted into the locked position, it becomes evident that line crimping and line size limitations are assured. Wetherald's design incorporates the use of a screw (patent drawings indicate that this adjustment requires the use of a screwdriver) to make trigger tension adjustments. Whenever additional tools are required, the ease in which a device can be used is sharply reduced. Also, a proper release of the fishing line cannot be achieved inthat Wetherald has treated the vertical and horizontal forces as one common force. Again, these forces must be addressed individually, as they have so be addressed with the present invention. Any force applied to a release device by a fishing line leading from a fishing rod to a release mechanism is influenced when the downrigger depth is altered, or the boat or current speed changes. If these vertical forces are isolated from the effects of the horizontal forces, such changes will not influence the amount of pull required to trip the release mechanism and free the fishing line.

Other line release devices may also be found in Spring, 1991 mail order catalogs i.e., Pro Bass—Cabela's—and Gander Mountain and fishing equipment outlets. Examples of these releases are: Cannon—Universal Line Release, Quick Stacker, Quick Release—Walker—Adjustable Line Release, Adjustable Stacking Line Release—Wille—Deep Dive Towline Release, Snappy Line Release, Tow Line Release—Black's—Release With Snap, Release without Snap—Roemer—Tension Adjustable Release,—Offshore Downrigger Release—Single Release, Stacker Release, Walleye Release—Laurvick Planing Board Release—Standard, Colored—Scotty—Hair Trigger, Extended Hair Trigger.

However, all fishing line releases heretofore known suffer from a number of disadvantages and should not be limited to only those cited above.

OBJECTS AND ADVANTAGES

Accordingly, several objects and advantages of my invention are:

(a) to provide a mechanism that isolates the vertical and horizontal forces that effect the control of the holding and releasing of a line used in partnership with a downrigger fishing system, or other applicable fishing devices;

(b) to provide a fishing line tender control device that eliminates the accidental release of the fishing line as a result of a downrigger weight bouncing when fishing rough waters;

(c) to provide a fishing line tender control device that eliminates the accidental release of the fishing line as the downrigger weight and fishing line are being lowered to the desired fishing depth;

(d) to provide a fishing line tender control device that prevents the fishing line from being crimped when it is locked within the line tender control mechanism;

(e) to provide a fishing line tender control device that can be installed on the fin of an existing downrigger weight;

(f) to provide a fishing line tender control device that can be installed on a downrigger cable, or use several line tender control devices simultaneously on the the same downrigger system;

(g) to provide a line tender control mechanism that incorporates multiple trip lever tension adjustments to accommodate various fishing conditions—boat speed, lure size, line depth and other factors that place drag on the fishing line;

(h) to provide a line tender control mechanism whereby one or more such units can be connected to a downrigger system concurrently;

(i) to provide a line tender control mechanism that is small and easily stored when not in use;

(h) to provide a line tender control mechanism that is simple in design and inexpensive to manufacture;

(j) to provide a line tender control mechanism whereby a fatigued compression pad can be easily replaced; and (k) to provide a line tender control mechanism that can be inexpensively manufactured in any desired color.

Further objects and advantages are to provide a mechanism which: a) is of a single body design, b) has three pins at one end for the purpose of easily connecting the device to a cable, c) accommodates various size lures and baits, d) remains closed until a horizontal force is applied to the bait end of the fishing line, e) has multiple trip lever settings, f) requires no tools to make adjustments, and g) allows the use of several sizes of fishing line, such as 10, 15, 30, 40, pound test etc. Still additional objects and advantages of the present invention will become apparent hereinafter from the specifications and from the account of the appended claims, particularly when read in conjunction with the accompanying drawings.

Reference Numerals In Drawings

| | | |
|---|---|---|
| 20 fishing rod | 22 downrigger reel | 24 fishing line |
| 26 boat | 28 downrigger cable | 30 downrigger weight |
| 32 fishing line tender control (present invention, connected to downrigger cable) | | |
| 34 fishing line tender control (present invention, mounted to downrigger weight) | | |
| 36 fishing line as it leaves the line tender control mechanism | | |
| 38 fishing lure/bait | 40 line retainer | 41 spring slot |
| 42 trip lever | 43 hole #1 | 44 a, b, c tension notches |
| 45 pin, trip lever spring | 46 shaft | 47 trip lever spring |
| 48 compression plate | 49 hole #2 | 50 compression pad |
| 51 hole #3 | 52 base | 53 pin, compression plate |
| 54 shaft seat | 55 spring connecting block | 56 shaft assembly slot |
| 58 trip lever stop | 60 pivot point | 62 recoil plate |
| 64 mounting hole | 66 #1 outside pin | 68 center pin |
| 70 #2 outside pin | 72 fishing line notch | 74 fish |

DESCRIPTION—FIGS. 1 to 5

Figure 1:
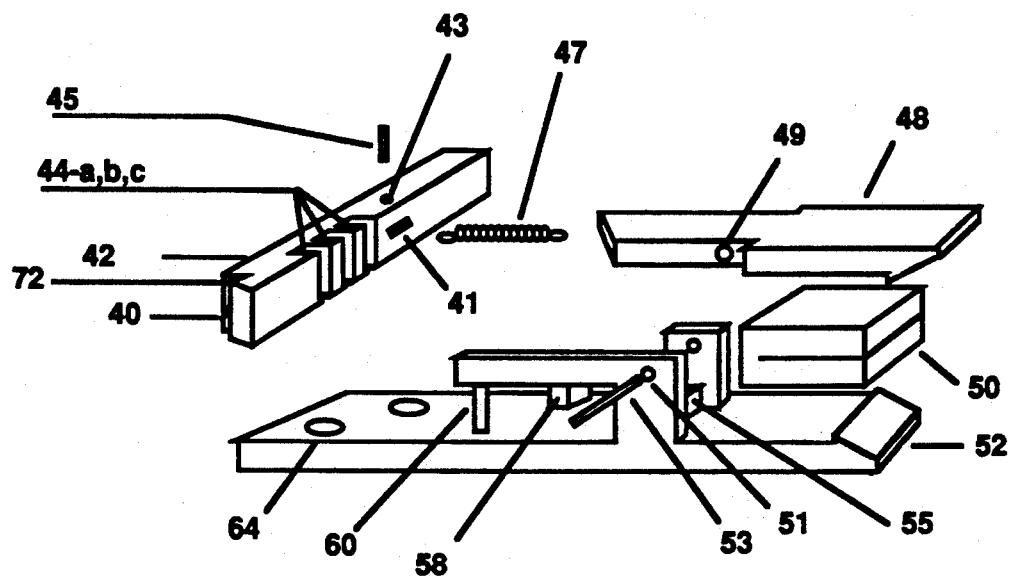
FIG. 1 is a bottom elevation view, with parts broken away, of the alternative embodiment having a different trip lever spring design than the preferred embodiment of the present invention.
Figure 2:
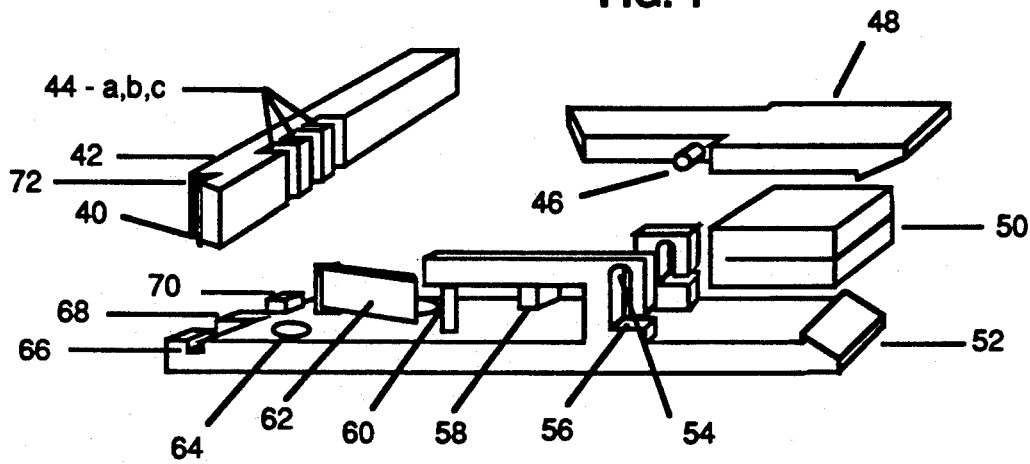
FIG. 2 is a bottom elevation view, with parts broken away, of the PREFERRED embodiment of the present invention.

A typical embodiment of the line tender control of the present invention is illustrated in FIG. 1 (alternative embodiment) and FIG. 2 (Preferred embodiment). The line tender control has four major parts consisting of a trip lever 42, a compression plate 48, a compression pad 50, and a base 52. The line tender control can be constructed of, but not limited to, machined metals or plastics i.e., brass, aluminum, stainless steel, polycarbonate, polyvinylchloride, polyolefin, acetal polymers, polyurethane, teflon. As with the preferred embodiment FIG. 2, it can be injection molded of most any thermoplastic material such as, acetal thermoplastic polymer, polyurethane, nylon, Delrin ®, Teflon ®, Celcon ®, Trolon ®; or constructed of various plasticized, impregnated or laminated fibrous materials, cardboard, paper, cloth etc.

To better visualize the construction of the present invention, the perspective breakaway drawings in FIGS. 1 and 2 provide two views of the line tender control device. The four major parts have been broken away illustrating the design simplicity engineered into the architecture of the present invention. Inthat both embodiments function identically, the alternative embodiment in FIG. 1 has a steel spring 47, and two non-corrosive pins 45 and 53. Whereas the recoil plate 62 designed into the preferred line tender control, illustrated in FIG. 2, eliminates the need for the steel spring 47 and pin 45 in FIG. 1. Pin 53 in FIG. 1 has been replaced in FIG. 2 with a shaft 46 that is an integral part of the compression plate 48. The design of the preferred embodiment reduces the total number of parts, simplifies component assembly, therein reducing production cost.

Figure 3:
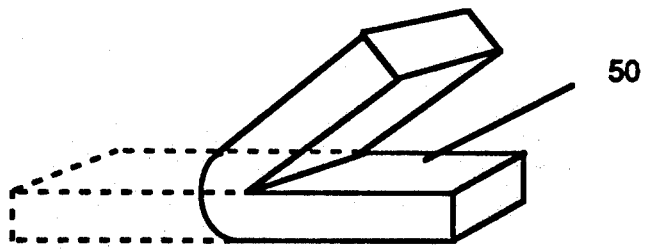
FIG. 3 is a bottom elevation view illustrating the center-line fold of a single piece of compressible material, which when folded, comprises the upper and lower members of the compression pad.

At one end of the line tender control of the present invention is a compression pad 50 typically constructed of a 25 mm×25 mm piece of compressible material, such as rubber, folded in half as illustrated in FIG. 3. The pad 50 is held in place by the compression plate 48 and the base 52. The compression pad is prevented from exiting the front of the device by a small shoulder, roughly 0.8 mm high.

The compression plate 48 is inserted into the body frame at location 56 and moved upward into place at the top of the shaft seat 54; the compression plate is held in place by shaft 46 and allowed to pivot at shaft seat 54 when unlocked by the trip lever mechanism 42.

The trip lever mechanism 42 is securely held in place by the trip lever stop 58, the pivot point 60 and the recoil plate 62. The unique design of the embodiment of the trip lever mechanism 42 allows easy removal of the trip lever should replacement be required.

The base 52 of present invention including pivot point 60, shaft seat 54, recoil plate 62, trip lever stop 58, screw mounting holes 64, and connecting pins 66, 68, 70 are constructed of one piece of strong, rigid, self-lubricating, wear resistant acetal resin thermoplastic approximately 76 mm×25 mm×16 mm. Whereas the trip lever 42 and the compression plate 48 are individual parts, they too are fabricated of acetal resin thermoplastic.

Figure 4:
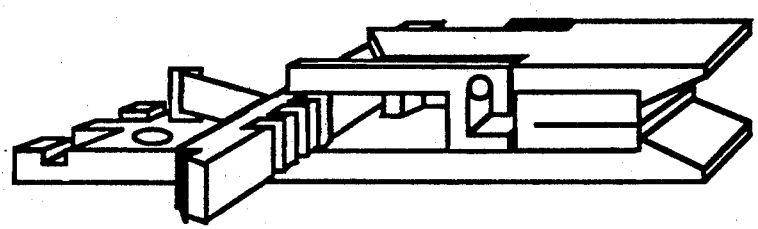
FIG. 4 shows a perspective view of the preferred embodiment of the present invention fully assembled and in a closed position.

The unparalleled compactness and simplicity of the design of the line tender control is reflected in the fully assembled perspective view of the preferred embodiment of the present invention in FIG. 4.

Figure 5:
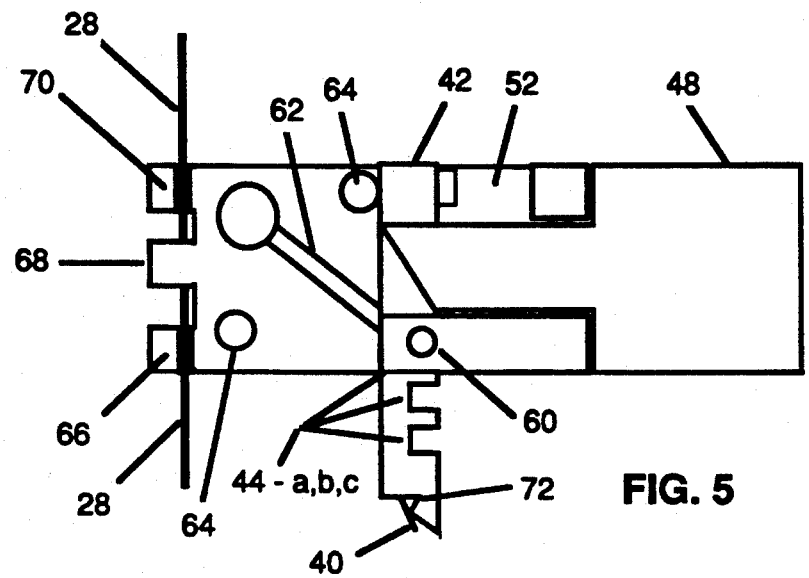
FIG. 5 shows a side view of the present invention and the placement of a cable in the grooves at the connector end of the mechanism.

The connector end of the line tender control of the present invention utilizes a three pin design for the purpose of connecting the device to the downrigger cable. Each pin extends from the base approximately 6.3 mm, and is roughly 6.3 mm×6.3 mm square. The outer pins, 66 and 70 have a grove roughly 4.7 mm×2.5 mm at the top as illustrated in FIG. 5. This design allows the line tender control to be quickly connected and disconnected from a downrigger cable.

OPERATION—FIGS. 5–11

Figure 6:
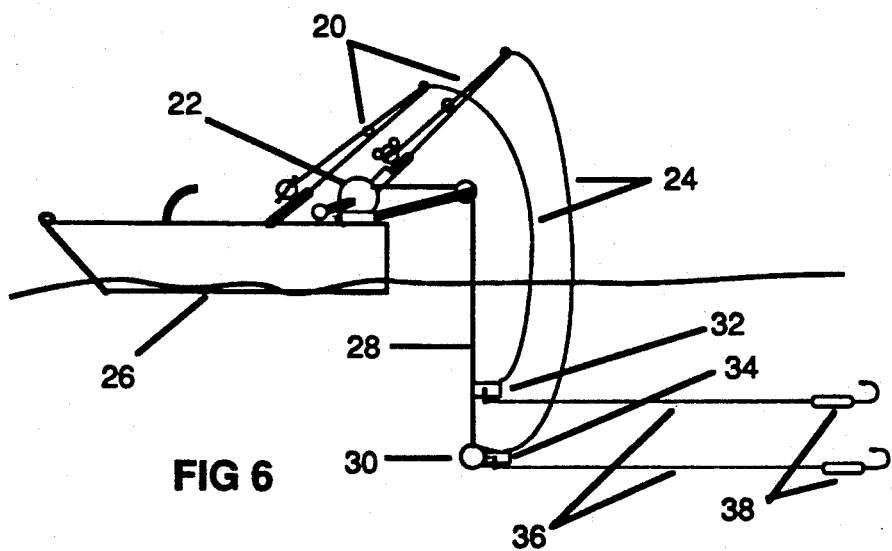
FIG. 6 is a schematic view of a downrigger cable fishing system and two fishing rods being fished from a boat with one line tender control device of the present invention attached to a downrigger cable and a second line tender control device attached to the fin of a downrigger weight.

FIG. 6 shows the general operation of the present invention as it relates to the use of a conventional downrigger fishing system. When fishing from a moving boat 26 a downrigger reel 22 containing several hundred feet of steel cable 28 is used to lower a weight 30, attached to its end, to a desired fishing depth. As the boat moves forward in the water, the weight holds the cable 28 in a near vertical position. Attached at any point along the cable is one or more of the fishing line-tender control devices 32 of the present invention allowing several rods to be fished from a single downrigger system at the same time. Also shown, is another device 34 of the present invention attached to the fin of the downrigger weight 30. Tests conducted using line control devices attached directly to the weight resulted in a more positive strike action by the fish than control devices attached directly to the cable 28, which has a greater flex or give when a horizontal force is applied to the line 36. Therefore, the present invention 32/34 is designed to accommodate both attachment locations. Before the downrigger weight is lowered, several yards of the fishing line 24, which is attached to the fishing rod 20 and equipped with a bait 38, are spooled out creating a horizontal trolling line 36 (the length of the trolling line 36 is dictated by the immediate fishing conditions and may vary considerably). Accordingly, the line 24 is continuous from the rod 20 to the bait 38 and does not require a leader unless so desired. The fishing lines 24 are then attached to the line tender control devices 32/34 of the present invention and the cable 28, the weight and the fishing lines 24 are lowered by the downrigger reel 22 to the desired fishing depth.

The attachment of the present invention to the downrigger cable 28 requires minimal effort on the part of the user. The path used for connecting the line tender control device 32 to the cable 28 is clearly outlined in FIG. 5. The device 32 is attached by first placing the cable 28 over the top of the outside pin 66, making sure that the cable is centered in the pin's notch; then placing the cable under the second pin 68 (this pin has no notch), and lastly position the cable over the top of the remaining outside pin 70, again locating the cable in the notch. The device is now securely connected to the downrigger cable and will not slip as it is lowered to the selected fishing depth. After drilling two holes (drill size #26) in the fin of the downrigger weight, that match the holes 64 provided as a part of the line tender control device 32, the line tender control can be securely mounted to the downrigger weight using two #6-32 screws.

Figure 7:
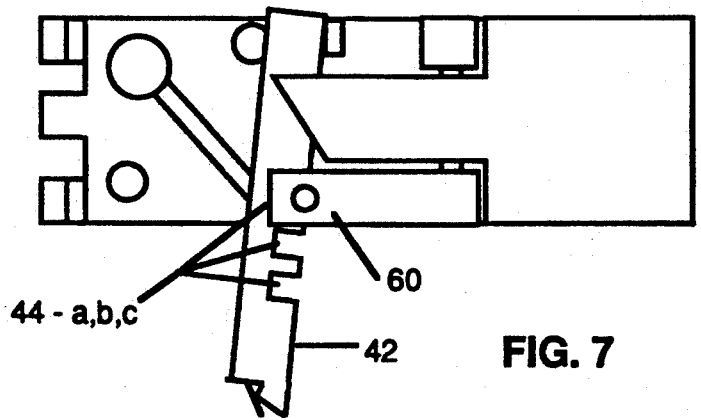
FIG. 7 is a side view of the present invention with the trip lever mechanism positioned away from the pivot pin to make trip lever tension adjustments.

FIG. 7 is a side view showing the trip lever 42 and its three tension notches 44 a,b,c. These notches are provided in that a more accurate resistance to the horizontal force applied to the fishing line 36 can be established. These forces will change as different size lures and baits are used. Also, it is desirable to increase the trip lever 42 tension when fishing for large fish. Large fish tend to have a tougher mouth than smaller fish therefore, a firm hook set improves the chances of landing a larger fish. The tension notches 44 a,b,c can be easily selected by moving the lower part of the trip lever 42 toward the connector end of the control device 32 until the engaged notch is clear of the pivot point 60, then simply slide the trip lever to the desired notch and release. The trip lever 42 will automatically engage when released. In that each notch increases the trip lever's resistance to the horizontal forces, so must the pull at the bait end of the line 36 be increased before the line-tender control mechanism will open and release the fishing line.

Figure 8:
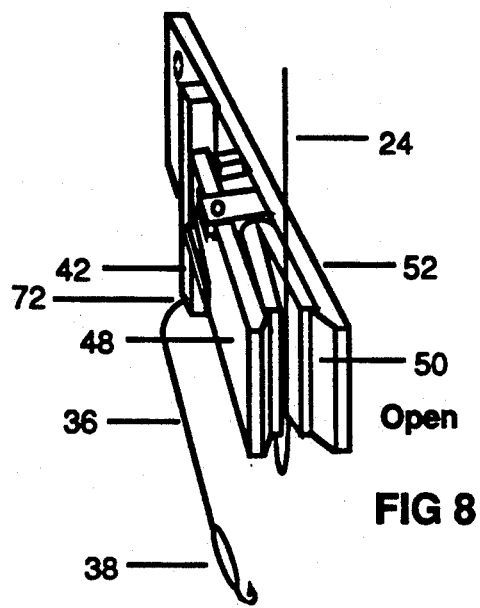
FIG. 8 shows a top frontal vertical perspective view of the present invention in an open position with a fishing line drawn through the compression pad.
Figure 9:
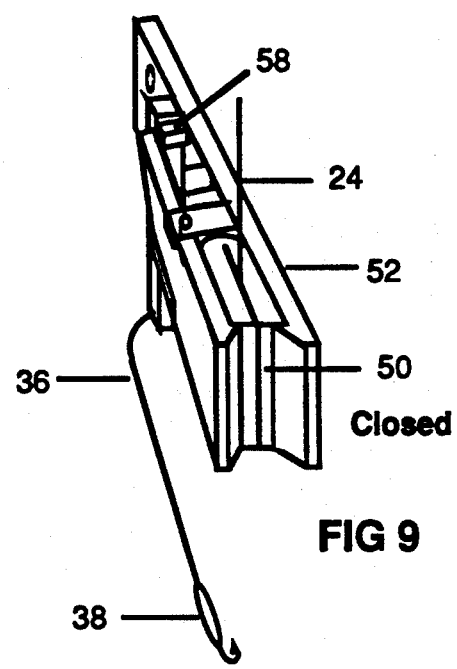
FIG. 9 shows a top frontal vertical perspective view of a second embodiment of FIG. 8 with the mechanism in a closed position.
Figure 10:
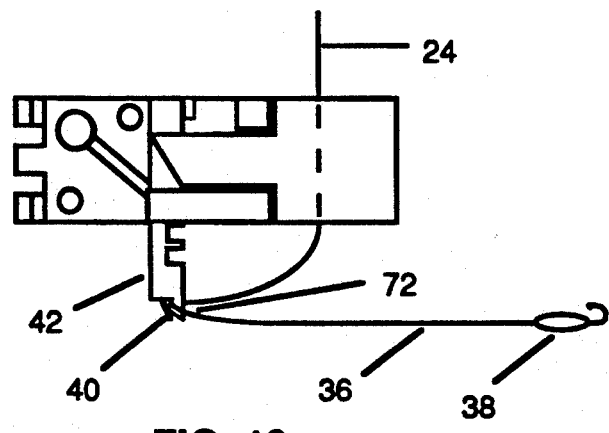
FIG. 10 is a side view of the present invention displaying the loading path of a fishing line.

Illustrated in FIGS. 8–11, the line tender control device 32 can be fully examined as to its design and operational functions. FIG. 8 is a top frontal vertical perspective view diagramming the control device 32 in the open position with the fishing line 24 drawn between the rubber compression pad 50 that is held into place by the main body 52 and the compression plate 48. The compression pad 50 is then closed FIG. 9 by using the thumb and forefinger to apply a gripping pressure to the sides of the compression plate 48 and the body 52 at the line control end of the device 32. The compression pad 50 must be closed sufficiently so as to allow the upper part of the trip lever 42, above the pivot point 60, to move underneath the rear section of the compression plate and forward until it reaches the trip lever stop 58. The trip lever's 42 movement is achieved as the recoil plate 62 is always under load when the line tender control device 32 is in the open position FIG. 10 outlines the path of the fishing line 24 as it is pulled between the line retainer 40 and the front lip of the fishing line notch 72 at the bottom of the trip lever 42. As the clearance between the lip of the fishing line notch 72 and the line retainer is zero, the line will snap into place. The snapping action assures a positive capture of the fishing line 24 whereinthat should the boat 26 come to a stop allowing the lower section of the fishing line 36 to drop to a vertical position it will not disengage from the line tender control.

Figure 11:
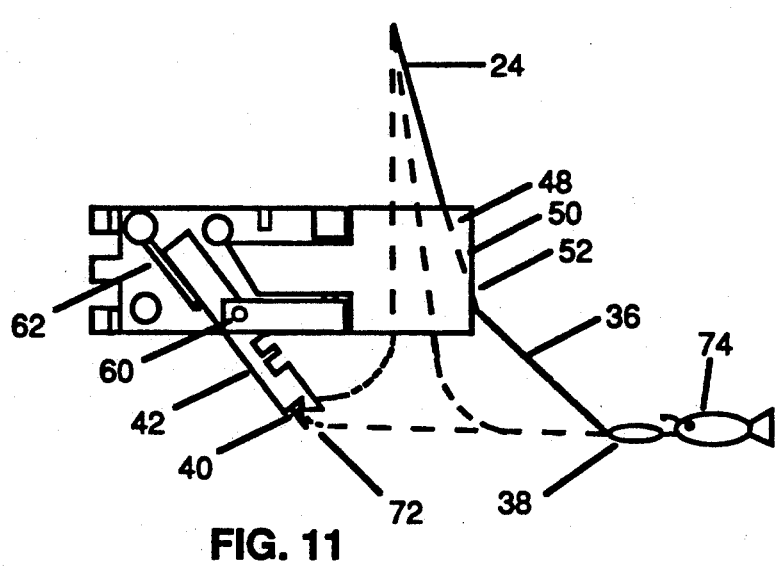
FIG. 11 is a side view of the present invention illustrating the control action of a fishing line when a rearward force is applied to the bait, as induce by a fish strike.

FIG. 11 schematically diagrams the path of the fishing line 24 as it fully releases when a horizontal force (fish 74) is applied to the bait 38 attached to line 36. To disconnect the fishing line from the line tender control, a sufficient horizontal force in the rearward direction is applied to the bait 38 thereby pulling the trip lever 42 below the pivot point 60 in the same direction as the applied force. The trip lever section above the pivot point 60 is moved away from the trip lever's 42 stop and against the recoil plate 62. As the trip lever 42 clears the rear of the compression plate 48 the compression plate is unlocked allowing it to pivot at the location of the shaft seat 54, thereby opening the rubber compression pad and releasing the fishing line 24. As there is a limit to the travel of the recoil plate 62, the fishing line 24 is released when the trip lever 42 achieves its maximum rearward position. As a result of this action, the fishing line 24 captured in the fishing line notch 72 and the rubber compression pad 50 is released almost simultaneously. Once the fishing line has cleared the line tender control device 32, the fisherman can enjoy the fight of the fish unhampered by any unnecessary weight.

SUMMARY, RAMIFICATION, and SCOPE

Accordingly, the reader will see that the line tender control device of this invention, when attached to a downrigger fishing system can be used to hold and release a fishing line at a desired depth and under all fishing conditions. The line tender control can be connected to any downrigger cable or weight fin, its use is easily understood and can be employed by most any person. The line tender control can remain connected to the weight, or quickly removed from the downrigger cable for storage. Missing, broken, or damaged parts are replaceable in the field, requiring minimal effort on the part of the user. Furthermore, this invention has the additional advantages in that:

it permits the production of the line tender control in a variety of colors without requiring the manufacturer to use a separate facility for the compounding of the powdered or liquid pigments needed in the production of most colored products;

it permits the production of the line tender control in custom colors, as required for commercialization;

it permits the production of a line tender control carrying personalized trade marks or logos; and it allows the line tender control to be produced of strong lightweight materials that will continue to function satisfactorily under extreme fishing conditions.

Although the description above contains many specifications, these should not be construed as limiting the scope of the present invention but as merely providing illustrations of some of the presently preferred embodiments of this invention. For example, the line tender control can have other shapes, such as circular, oval, square, etc.; the trip lever can have more or less than three tension settings; the compression pad can be bonded to the base structure, the present invention can be used in partnership with any appropriate device, and can be injection molded from a wide range of thermoplastics, or machined from plastic or metal, etc.

Thus the scope of the invention should be determined by the appended claims and their legal equivalents, rather than by the examples given.

I claim:

1. A fishing line release for downrigger trolling comprising a base having risers and a downrigger cable attachment means, a compression plate pivotally mounted parallel to said base and attached to said risers, a compression pad mounted between said base and said compression plate, a pivotally mounted trip lever mounted orthogonally to said base between said base and one end of said compression plate, a recoil plate pivotally attached perpendicular to said base such that said trip lever contacts said recoil plate, whereby a fishing line is inserted between said compression pad located between said compression plate and said base and said fishing line is attached to said trip lever so that a pull on said fishing line will pivot said trip lever from under said compression plate to release said fishing line.

2. The fishing line release of claim 1 wherein said base has mounting holes.

3. The fishing line release of claim 1 wherein said trip lever has several trigger release tension adjustments.

* * * * *